(12) United States Patent
Mi et al.

(10) Patent No.: US 12,200,740 B2
(45) Date of Patent: Jan. 14, 2025

(54) COMMUNICATION METHOD AND COMMUNICATIONS APPARATUS

(71) Applicant: HUAWEI TECHNOLOGIES CO., LTD., Guangdong (CN)

(72) Inventors: Xiang Mi, Beijing (CN); Zhihu Luo, Beijing (CN); Xiaolei Tie, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 965 days.

(21) Appl. No.: 17/214,187

(22) Filed: Mar. 26, 2021

(65) Prior Publication Data
US 2021/0219297 A1 Jul. 15, 2021

Related U.S. Application Data

(63) Continuation of application No. PCT/CN2018/108410, filed on Sep. 28, 2018.

(51) Int. Cl.
*H04W 72/53* (2023.01)
*H04W 72/23* (2023.01)
*H04W 74/0833* (2024.01)
*H04W 76/36* (2018.01)

(52) U.S. Cl.
CPC ........... *H04W 72/53* (2023.01); *H04W 72/23* (2023.01); *H04W 74/0833* (2013.01); *H04W 76/36* (2018.02)

(58) Field of Classification Search
None
See application file for complete search history.

(56) References Cited

U.S. PATENT DOCUMENTS

2017/0331577 A1* 11/2017 Parkvall ................ H04L 5/1469
2018/0199359 A1* 7/2018 Cao ....................... H04L 1/1896
2019/0007181 A1* 1/2019 Marinier ............... H04L 5/0051

FOREIGN PATENT DOCUMENTS

| CN | 106788912 A | 5/2017 |
| CN | 106993332 A | 7/2017 |
| CN | 108282247 A | 7/2018 |

(Continued)

OTHER PUBLICATIONS

Qualcomm Incorporated, "Support for transmission in preconfigured UL resources," 3GPP TSG RAN WG1 Meeting 94, R1-1809032, Gothenburg, Sweden, Aug. 20-24, 2018, 6 pages.*

(Continued)

*Primary Examiner* — Shukri Taha
(74) *Attorney, Agent, or Firm* — Fish & Richardson P.C.

(57) ABSTRACT

This application provides example communication methods and apparatuses. One example method includes performing, by a network device on a preconfigured resource, data demodulation on uplink data from a terminal device. The network device can then send downlink control information (DCI) to the terminal device, where the DCI includes first indication information, and if the uplink data fails to be demodulated, or it is determined, based on a result of the data demodulation, that the terminal device needs to retransmit the uplink data, the first indication information indicates either the terminal device to initiate random access or EDT and retransmit the uplink data or that the uplink data fails to be demodulated.

19 Claims, 4 Drawing Sheets

(56) References Cited

FOREIGN PATENT DOCUMENTS

| EP | 3846568 B1 * | 9/2019 | ............... H04L 1/08 |
|---|---|---|---|
| EP | 3846568 A1 | 7/2021 | |
| WO | 2018127201 A1 | 7/2018 | |
| WO | 2018146834 A1 | 8/2018 | |

OTHER PUBLICATIONS

Ericsson, Huawei, "New WID on Rel-16 enhancements for NB-IoT," 3GPP TSG RAN Meeting #80, RP-181451, La Jolla, USA, Jun. 11-14, 2018, 4 pages.

PCT International Search Report and Written Opinion issued in International Application No. PCT/CN2018/108410 on Apr. 24, 2019, 19 pages (with English translation).

Extended European Search Report issued in European Application No. 18935796.5 on Sep. 29, 2021, 14 pages.

Nokia, Nokia Shanghai Bell, "Signaling Aspects for transmission in preconfigured resources," 3GPP TSG RAN WG2 Meeting #103bis, R2-1814413, Chengdu, China, Oct. 8-12, 2018, 2 pages.

Nokia, Nokia Shanghai Bell, "Transmission in preconfigured UL resources," 3GPP TSG RAN WG1 Meeting #94, R1-1808431, Gothenburg, Sweden, Aug. 20-24, 2018, 4 pages.

Sony, "Transmission in preconfigure," UL resources. 3GPP TSG RAN WG1 Meeting #94, R1-1808348, Gothenburg, Sweden, Aug. 20-24, 2018, R1-1808348, 4 pages.

3GPP TS 36.212 V15.3.0, "3rd Generation Partnership Project; Technical Specification Group Radio Access Network; Evolved Universal Terrestrial Radio Access (E-UTRA); Multiplexing and channel coding (Release 15)," Sep. 2018, 247 pages.

3GPP TS 36.213 V15.2.0, "3rd Generation Partnership Project; Technical Specification Group Radio Access Network; Evolved Universal Terrestrial Radio Access (E-UTRA); Physical layer procedures (Release 15)," Jun. 2018, 541 pages.

3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)," Jul. 2018, 126 pages.

3GPP TS 36.331 V15.3.0, "3rd Generation Partnership Project; Technical Specification Group Radio Access Network; Evolved Universal Terrestrial Radio Access (E-UTRA); Radio Resource Control (RRC); Protocol specification (Release 15)," Sep. 2018, 918 pages.

Office Action issued in Chinese Application No. 201880097831.1 on Sep. 22, 2022, 14 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/108410, filed on Sep. 28, 2018, the disclosure of which is hereby incorporated by reference in its entirety.

TECHNICAL FIELD

This application relates to the field of wireless communications technologies, and in particular, to a communication method and a communications apparatus.

BACKGROUND

A narrowband internet of things (narrowband internet of things, NB-IoT) is a network oriented towards machine type communication (machine type communication, MTC), and is an important network in the future communications field. Internet-of-things communication is mainly applied to scenarios such as smart metering, medical detection and monitoring, logistics detection, industrial detection and monitoring, an internet of vehicles, intelligent communities, and wearable-device communication. In the NB-IoT, when a terminal device needs to transmit uplink data, the terminal device needs to request an uplink resource from a base station. Then, the base station delivers uplink transmission scheduling information based on a request of the terminal device. The terminal device transmits the uplink data based on an uplink resource scheduled based on the uplink transmission scheduling information. Finally, the base station sends downlink control information (downlink control information, DCI) of a corresponding format (format) based on a demodulation status of the uplink data. The format of the DCI includes DCI format N0, DCI format N1, and the like.

Currently, an uplink scheduling-free transmission technology is studied in the NB-IoT. Uplink scheduling-free transmission may also be referred to as grant-free transmission, uplink transmission in preconfigured resources, transmission in preconfigured UL resources, or the like, and is referred to as uplink scheduling-free transmission hereinafter. In the uplink scheduling-free transmission technology, a base station preconfigures an uplink scheduling-free resource for a terminal device. When the terminal device needs to transmit uplink data, the terminal device directly transmits the uplink data on the preconfigured resource in a pre-specified sending manner. The base station sends feedback information based on a demodulation status of the uplink data.

However, in the uplink scheduling-free transmission technology, there is no clear solution for content of the feedback information sent by the base station, and this is an urgent problem to be resolved.

SUMMARY

An objective of implementations of this application is to provide a communication method and a communications apparatus, to resolve a problem of how a network device sends feedback information in an uplink scheduling-free transmission technology.

According to a first aspect, an embodiment of this application provides a communication method. The method includes: A network device performs, on a preconfigured resource, data demodulation on uplink data sent by a terminal device; and the network device sends DCI to the terminal device, where the DC includes first indication information, and if the uplink data fails to be demodulated, or it is determined, based on a result of the data demodulation, that the terminal device needs to retransmit the uplink data, the first indication information is used to: indicate the terminal device to initiate random access or early data transmission and retransmit the uplink data, or indicate that the uplink data fails to be demodulated; or if the uplink data is successfully demodulated, or it is determined, based on a result of the data demodulation, that the terminal device does not need to retransmit the uplink data, the first indication information is used to indicate the terminal device to release or deactivate the preconfigured resource.

According to the foregoing method, the network device indicates, by using the DCI, a result of demodulating the uplink data, and indicates the terminal device to perform a corresponding action, for example, to initiate the random access or the early data transmission when the demodulation fails; to release or deactivate the preconfigured resource when the demodulation succeeds. Therefore, the terminal device can determine whether the sent uplink data is successfully demodulated, so that in scheduling-free transmission, feedback to the data transmitted by the terminal device can be provided and the terminal device may be flexibly and effectively scheduled to perform data transmission.

In a possible design, if the uplink data fails to be demodulated, or it is determined, based on the result of the data demodulation, that the terminal device needs to retransmit the uplink data, the first indication information is further used to indicate the terminal device to release or deactivate the preconfigured resource.

According to the foregoing method, when the uplink data fails to be demodulated, the terminal device is indicated to release or deactivate the preconfigured resource. This can avoid a data demodulation failure caused when the terminal device transmits the uplink data by using the preconfigured resource again, thereby improving data transmission efficiency and resource utilization.

In a possible design, the DCI includes a first field, and the first field is used to carry the first indication information; and when an idle state of the first field is a first preset state, the first indication information is used to: indicate the terminal device to initiate the random access and retransmit the uplink data, or indicate that the uplink data fails to be demodulated; or when an idle state of the first field is a second preset state, the first indication information is used to: indicate the terminal device to initiate the random access and retransmit the uplink data, or indicate that the uplink data fails to be demodulated, and indicate to deactivate the preconfigured resource; or when an idle state of the first field is a third preset state, the first indication information is used to: indicate the terminal device to initiate the random access and retransmit the uplink data, or indicate that the uplink data fails to be demodulated, and indicate to release the preconfigured resource; or when an idle state of the first field is a fourth preset state, the first indication information is used to: indicate the terminal device to initiate the EDT and retransmit the uplink data, or indicate that the uplink data fails to be demodulated; or when an idle state of the first field is a fifth preset state, the first indication information is used to: indicate the terminal device to initiate the EDT and retransmit the uplink data, or indicate that the uplink data fails to be demodulated, and indicate to deactivate the preconfigured resource: or when an idle state of the first field is a sixth preset state, the first indication information is used to: indicate the terminal device to initiate the EDT and retransmit the uplink data, or indicate that the uplink data fails to be demodulated, and indicate to release the preconfigured resource.

In a possible design, a format of the DCI is DCI format N0, and the first field is a subcarrier indication field.

By using an existing format of the DCI, compatibility with an existing protocol can be implemented, and complexity of blindly detecting the DCI by the terminal device is not increased.

In a possible design, the DCI includes a second field and preamble indication information, the second field is used to carry the first indication information, and the preamble indication information is used to indicate a preamble; and when an idle state of the second field is a first preset state, the first indication information is used to: indicate the terminal device to initiate the random access or the EDT based on the preamble and retransmit the uplink data, or indicate that the uplink data fails to be demodulated; or when an idle state of the second field is a second preset state, the first indication information is used to: indicate the terminal device to initiate the random access or the EDT based on the preamble and retransmit the uplink data, or indicate that the uplink data fails to be demodulated, and indicate to deactivate the preconfigured resource: or when an idle state of the second field is a third preset state, the first indication information is used to: indicate the terminal device to initiate the random access or the EDT based on the preamble and retransmit the uplink data, or indicate that the uplink data fails to be demodulated, and indicate to release the preconfigured resource.

In a possible design, the DCI includes M idle bits and preamble indication information, N idle bits in the M idle bits are used to carry the first indication information, and the preamble indication information is used to indicate a preamble, where N is an integer greater than 0 and less than or equal to M, and M is an integer greater than 0; and when a value of the N idle bits is a first preset value, the first indication information is used to: indicate the terminal device to initiate the random access or the EDT based on the preamble and retransmit the uplink data, or indicate that the uplink data fails to be demodulated; or when a value of the N idle bits is a second preset value, the first indication information is used to: indicate the terminal device to initiate the random access or the EDT based on the preamble and retransmit the uplink data, or indicate that the uplink data fails to be demodulated, and indicate to deactivate the preconfigured resource; or when a value of the N idle bits is a third preset value, the first indication information is used to: indicate the terminal device to initiate the random access or the EDT based on the preamble and retransmit the uplink data, or indicate that the uplink data fails to be demodulated, and indicate to release the preconfigured resource.

In a possible design, a format of the DCI is DCI format N1, and the second field is a subcarrier indication of narrowband physical random access channel NPRACH field.

By using an existing format of the DCI, compatibility with an existing protocol can be implemented, and complexity of blindly detecting the DCI by the terminal device is not increased.

In a possible design, the DCI further includes second indication information, and the second indication information is used to indicate a timing advance TA of the terminal device.

The TA is indicated, so that the terminal device can update the TA in time, thereby avoiding a data transmission failure caused by an excessively large TA error.

In a possible design, the DCI further includes third indication information, and the third indication information is used to indicate a carrier used when the terminal device initiates the random access or the EDT.

In a possible design, a format of the DCI is a format other than DCI format N0 and DCI format N1.

In a possible design, the DCI is scrambled by using an RNTI other than a C-RNTI.

According to a second aspect, an embodiment of this application provides a communications apparatus. The communications apparatus includes a processor, and the processor is coupled to a memory. The memory is configured to store an instruction, and the processor is configured to execute the instruction stored in the memory, to perform the method according to any one of the first aspect or the possible designs of the first aspect. Optionally, the communications apparatus may further include the memory. Optionally, the communications apparatus may further include a transceiver, configured to support the communications apparatus in sending and/or receiving the information in the foregoing method. Optionally, the communications apparatus may be a network device, or may be an apparatus, for example, a chip or a chip system, in a network device. The chip system includes at least one chip, and the chip system may further include another circuit structure and/or discrete component.

According to a third aspect, an embodiment of this application provides a communications apparatus. The communications apparatus is configured to implement the method according to any one of the first aspect or the possible designs of the first aspect. The communications apparatus includes corresponding function modules, for example, a processing unit and a transceiver unit, that are separately configured to implement the steps in the foregoing method.

According to a fourth aspect, an embodiment of this application provides a communication method. The method includes: A terminal device sends uplink data on a preconfigured resource: and the terminal device receives downlink control information DCI sent by a network device, where the DCI includes first indication information, and if the uplink data fails to be demodulated, or it is determined, based on a result of data demodulation, that the terminal device needs to retransmit the uplink data, the first indication information is used to: indicate the terminal device to initiate random access or early data transmission EDT and retransmit the uplink data, or indicate that the uplink data fails to be demodulated; or if the uplink data is successfully demodulated, or it is determined, based on a result of data demodulation, that the terminal device does not need to retransmit the uplink data, the first indication information is used to indicate the terminal device to release or deactivate the preconfigured resource.

According to the foregoing method, the terminal device receives the DCI sent by the network device, and may determine whether the uplink data sent on the preconfigured resource is successfully demodulated, to determine whether the uplink data needs to be retransmitted. Therefore, data transmission is flexibly and effectively performed in scheduling-free transmission.

In a possible design, before the terminal device receives the downlink control information DCI sent by the network device, the method further includes:

The terminal device receives a preamble index sent by the network device.

After the terminal device receives the downlink control information DCI sent by the network device, the method further includes: If the uplink data fails to be demodulated, or it is determined, based on the result of the data demodulation, that the terminal device needs to retransmit the uplink data, the terminal device initiates the random access or the EDT to the network device based on the preamble index.

In a possible design, if the uplink data fails to be demodulated, or it is determined, based on the result of the data demodulation, that the terminal device needs to retransmit the uplink data, the first indication information is further used to indicate the terminal device to release or deactivate the preconfigured resource.

In a possible design, the DCI includes a first field, and the first field is used to carry the first indication information; and when an idle state of the first field is a first preset state, the first indication information is used to: indicate the terminal device to initiate the random access and retransmit the uplink data, or indicate that the uplink data fails to be demodulated; or when an idle state of the first field is a second preset state, the first indication information is used to: indicate the terminal device to initiate the random access and retransmit the uplink data, or indicate that the uplink data fails to be demodulated, and indicate to deactivate the preconfigured resource; or when an idle state of the first field is a third preset state, the first indication information is used to: indicate the terminal device to initiate the random access and retransmit the uplink data, or indicate that the uplink data fails to be demodulated, and indicate to release the preconfigured resource; or when an idle state of the first field is a fourth preset state, the first indication information is used to: indicate the terminal device to initiate the EDT and retransmit the uplink data, or indicate that the uplink data fails to be demodulated; or when an idle state of the first field is a fifth preset state, the first indication information is used to: indicate the terminal device to initiate the EDT and retransmit the uplink data, or indicate that the uplink data fails to be demodulated, and indicate to deactivate the preconfigured resource; or when an idle state of the first field is a sixth preset state, the first indication information is used to: indicate the terminal device to initiate the EDT and retransmit the uplink data, or indicate that the uplink data fails to be demodulated, and indicate to release the preconfigured resource.

In a possible design, a format of the DCI is DCI format N0, and the first field is a subcarrier indication field.

By using an existing format of the DCI, compatibility with an existing protocol can be implemented, and complexity of blindly detecting the DCI by the terminal device is not increased.

In a possible design, the DCI includes a second field and preamble indication information, the second field is used to carry the first indication information, and the preamble indication information is used to indicate a preamble; and when an idle state of the second field is a first preset state, the first indication information is used to: indicate the terminal device to initiate the random access or the EDT based on the preamble and retransmit the uplink data, or indicate that the uplink data fails to be demodulated; or when an idle state of the second field is a second preset state, the first indication information is used to: indicate the terminal device to initiate the random access or the EDT based on the preamble and retransmit the uplink data, or indicate that the uplink data fails to be demodulated, and indicate to deactivate the preconfigured resource; or when an idle state of the second field is a third preset state, the first indication information is used to: indicate the terminal device to initiate the random access or the EDT based on the preamble and retransmit the uplink data, or indicate that the uplink data fails to be demodulated, and indicate to release the preconfigured resource.

In a possible design, the DCI includes M idle bits and preamble indication information, N idle bits in the M idle bits are used to carry the first indication information, and the preamble indication information is used to indicate a preamble, where N is an integer greater than 0 and less than or equal to M, and M is an integer greater than 0; and when a value of the N idle bits is a first preset value, the first indication information is used to: indicate the terminal device to initiate the random access or the EDT based on the preamble and retransmit the uplink data, or indicate that the uplink data fails to be demodulated; or when a value of the N idle bits is a second preset value, the first indication information is used to: indicate the terminal device to initiate the random access or the EDT based on the preamble and retransmit the uplink data, or indicate that the uplink data fails to be demodulated, and indicate to deactivate the preconfigured resource; or when a value of the N idle bits is a third preset value, the first indication information is used to: indicate the terminal device to initiate the random access or the EDT based on the preamble and retransmit the uplink data, or indicate that the uplink data fails to be demodulated, and indicate to release the preconfigured resource.

In a possible design, a format of the DCI is DCI format N1, and the second field is a subcarrier indication of narrowband physical random access channel NPRACH field.

By using an existing format of the DCI, compatibility with an existing protocol can be implemented, and complexity of blindly detecting the DCI by the terminal device is not increased.

In a possible design, the DCI further includes second indication information, and the second indication information is used to indicate a timing advance TA of the terminal device.

In a possible design, the DCI further includes third indication information, and the third indication information is used to indicate a carrier used when the terminal device initiates the random access or the EDT.

In a possible design, a format of the DCI is a format other than DCI format N0 and DCI format N1.

In a possible design, the DCI is scrambled by using an RNTI other than a C-RNTI.

According to a fifth aspect, an embodiment of this application provides a communications apparatus. The communications apparatus includes a processor, and the processor is coupled to a memory. The memory is configured to store an instruction, and the processor is configured to execute the instruction stored in the memory, to perform the method according to any one of the fourth aspect or the possible designs of the fourth aspect. Optionally, the communications apparatus may further include the memory. Optionally, the communications apparatus may further include a transceiver, configured to support the communications apparatus in sending and/or receiving the information in the foregoing method. Optionally, the communications apparatus may be a terminal device, or may be an apparatus, for example, a chip or a chip system, in a terminal device. The chip system includes at least one chip, and the chip system may further include another circuit structure and/or discrete component.

According to a sixth aspect, an embodiment of this application provides a communications apparatus. The communications apparatus is configured to implement the method according to any one of the fourth aspect or the possible designs of the fourth aspect. The communications apparatus includes corresponding function modules, for example, a processing unit and a transceiver unit, that are separately configured to implement the steps in the foregoing method.

An embodiment of this application provides a computer-readable storage medium. The computer-readable storage medium stores a computer-readable instruction: and when a computer reads and executes the computer-readable instruction, a communications apparatus is enabled to perform the method according to any one of the foregoing possible designs.

An embodiment of this application provides a computer program product. When a computer reads and executes the computer program product, a communications apparatus is enabled to perform the method according to any one of the foregoing possible designs.

An embodiment of this application provides a chip. The chip is connected to a memory, and is configured to read and execute a software program stored in the memory, to implement the method according to any one of the foregoing possible designs.

An embodiment of this application provides a communications apparatus. The apparatus includes a processor, and the processor is coupled to a memory and is configured to read and execute an instruction in the memory, to implement the method according to any one of the foregoing aspects or the possible designs of the foregoing aspects.

An embodiment of this application provides a communications system. The communications system includes the communications apparatus in the second aspect and the communications apparatus in the fifth aspect.

DETAILED DESCRIPTION OF EMBODIMENTS

The following further describes in detail embodiments of this application with reference to the accompanying drawings.

The embodiments of this application may be applied to various mobile communications systems, for example, a new radio (new radio, NR) system, a global system for mobile communications (global system of mobile communication, GSM) system, a code division multiple access (code division multiple access, CDMA) system, a wideband code division multiple access (wideband code division multiple access, WCDMA) system, a long term evolution (long term evolution, LTE) system, an advanced long term evolution (advanced long term evolution, LTE-A) system, and another communications system. This is not specifically limited herein.

Figure 1:
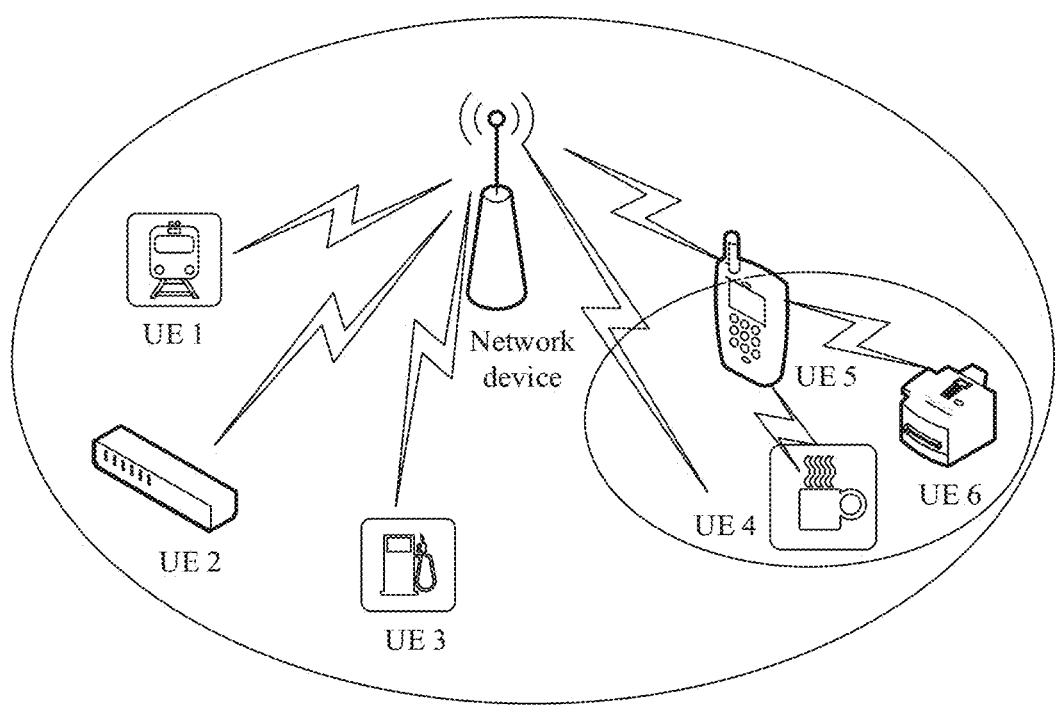
FIG. 1 is a schematic diagram of a communications system to which a communication method according to an embodiment of this application is applicable.

For ease of understanding the embodiments of this application, a communications system shown in FIG. 1 is first used as an example to describe in detail a communications system applicable to the embodiments of this application. FIG. 1 is a schematic diagram of a communications system to which a communication method according to an embodiment of this application is applicable. As shown in FIG. 1, a network device and UE 1 to UE 6 form a communications system. In the communications system, the UE 1 to the UE 6 may send uplink data to the network device, and the network device may also send downlink data to the UE 1 to the UE 6. In addition, the UE 4 to the UE 6 may also form a communications system. In this case, in the communications system, the network device may send downlink data of the UE 4 and the UE 6 to the UE 5, and the UE 5 forwards the downlink data to the UE 4 and the UE 6.

Specifically, in the embodiments of this application, a terminal device is a device that provides a user with voice and/or data connectivity and that has a wireless transceiver function or a chip that can be disposed in the device. The terminal device may communicate with one or more core networks through a radio access network (radio access network, RAN). The terminal device may be a mobile phone (mobile phone), a tablet computer (Pad), a computer with a wireless transceiver function, a personal digital assistant (personal digital assistant, PDA), a virtual reality (virtual reality. VR) terminal, an augmented reality (augmented reality. AR) terminal, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing terminal device and the chip that can be disposed in the foregoing terminal device are collectively referred to as a terminal device. The terminal device in the embodiments of this application may also be referred to as user equipment (user equipment, UE), a user terminal (user terminal), an access terminal (access terminal), a subscriber unit, a subscriber station, a mobile station (mobile station), a mobile (mobile), a remote station (remote station), a remote terminal (remote terminal), a mobile device, a wireless communications device, a user agent, or a user apparatus.

A network device is a device having a wireless transceiver function or a chip that can be disposed in the device. The network device may be configured to mutually convert a received over-the-air frame and an IP packet, and serve as a router between a terminal device and a remaining part of an access network, and may be further configured to coordinate attribute management of an air interface. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (a transmission reception point, TRP or a transmission point, TP), or the like. Alternatively, the device may be a gNB or a transmission point (a TRP or a TP) in a 5G (NR) system, or may be an antenna panel or a group of antenna panels (including a plurality of antenna panels) of a base station in a 5G system.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

The embodiments of this application may be applied to networks such as an NB-IoT and enhanced machine type communication (enhanced machine type communication, eMTC). Some scenarios of the embodiments of this application are described by using a scenario of the NB-IoT in a wireless communications network as an example. It should be noted that the solutions in the embodiments of this application may be further applied to another wireless communications network, and a corresponding name may also be replaced with a name of a corresponding function in the another wireless communications network.

Figure 2:
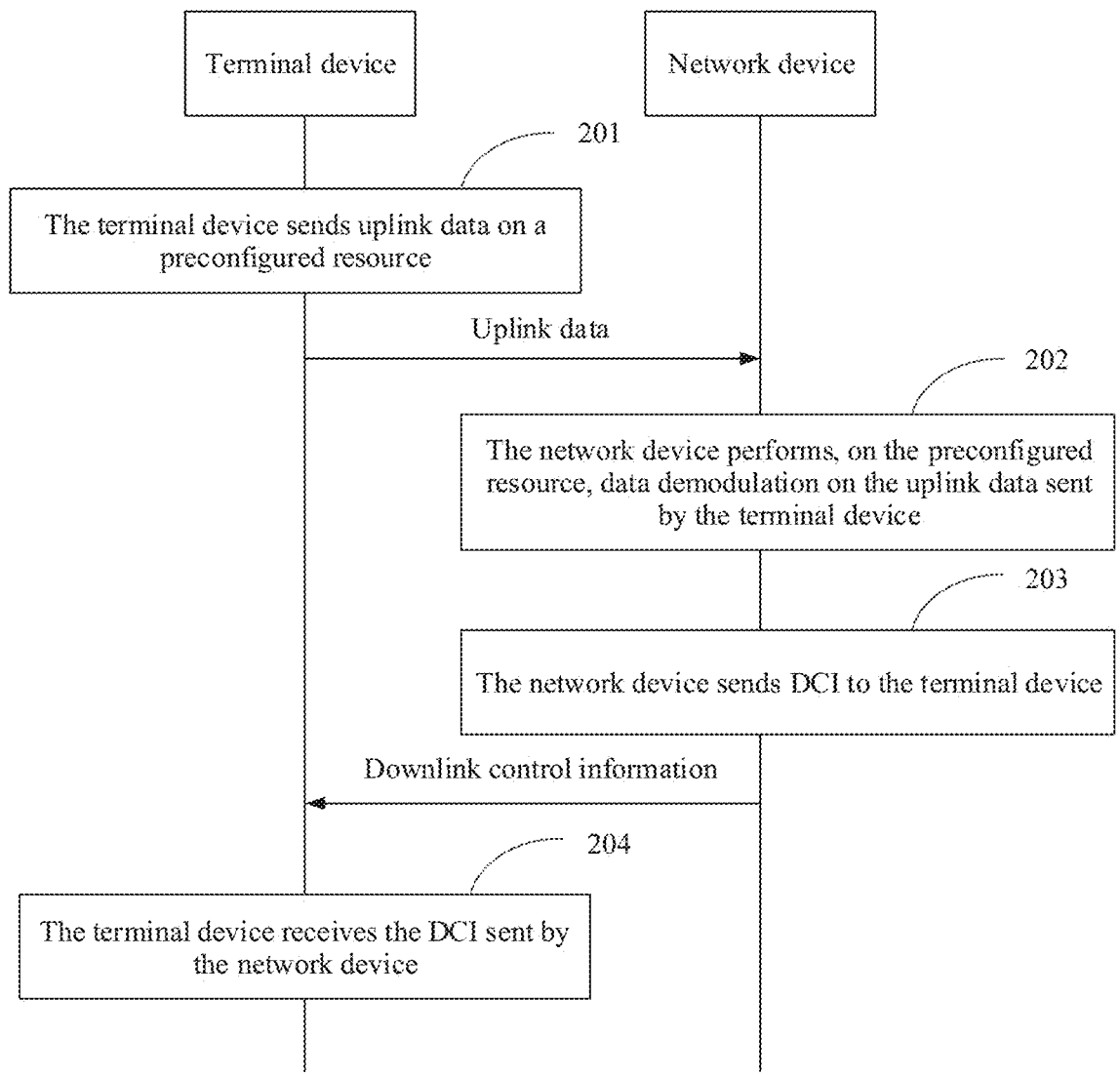
FIG. 2 is a schematic flowchart of a communication method according to an embodiment of this application.

With reference to the foregoing descriptions, FIG. 2 is a schematic flowchart of a communication method according to an embodiment of this application. Referring to FIG. 2, the method includes the following steps.

Step 201: A terminal device sends uplink data on a preconfigured resource.

It should be noted that the preconfigured resource is configured by a network device for the terminal device before the terminal device transmits the uplink data. A specific configuration method is not limited in this embodiment of this application. Before sending the uplink data on the preconfigured resource, the terminal device does not need to apply, to the network device, to use the preconfigured resource. After the network device configures the preconfigured resource, whether the terminal device uses the preconfigured resource and how the terminal device uses the preconfigured resource are not limited by the network device. The preconfigured resource may be considered as a scheduling-free resource.

Step 202: The network device performs, on the preconfigured resource, data demodulation on the uplink data sent by the terminal device.

Step 203: The network device sends DCI to the terminal device.

The DCI includes first indication information; and if the uplink data fails to be demodulated, or it is determined, based on a result of the data demodulation, that the terminal device needs to retransmit the uplink data, the first indication information is used to: indicate the terminal device to initiate random access or early data transmission (early data transmission. EDT) and retransmit the uplink data, or indicate that the uplink data fails to be demodulated: or if the uplink data is successfully demodulated, or it is determined, based on a result of the data demodulation, that the terminal device does not need to retransmit the uplink data, the first indication information is used to indicate the terminal device to release (release) or deactivate (deactive) the preconfigured resource. It should be noted that "deactivate" may also be referred to as "disable (disable)" or the like, and is referred to as "deactivate" in the embodiments of this application.

Further, optionally, if the uplink data fails to be demodulated, or it is determined, based on the result of the data demodulation, that the terminal device needs to retransmit the uplink data, the first indication information may be further used to indicate the terminal device to release or deactivate the preconfigured resource.

It should be noted that, in this embodiment of this application, deactivating the preconfigured resource may mean that the terminal device cannot use the preconfigured resource currently; and the terminal device can use the preconfigured resource again only when receiving an activation instruction sent by the network device. Releasing the preconfigured resource may mean that the terminal device deletes information related to the preconfigured resource, the terminal device cannot use the preconfigured resource, and the network device cannot indicate, by using an activation instruction, the terminal device to use the preconfigured resource again.

Step 204: The terminal device receives the DCI sent by the network device.

In this embodiment of this application, the network device may preconfigure at least one resource for the terminal device. The resource preconfigured by the network device is a scheduling-free resource. When sending the uplink data, the terminal device directly selects one resource from the at least one preconfigured resource to send the uplink data, and does not need to apply, to the network device, for a resource. Therefore, data transmission efficiency can be improved, and signaling resource overheads can be reduced.

It should be noted that how the network device preconfigures the at least one resource for the terminal device and how the terminal device selects a resource are not limited in this embodiment of this application. Details are not described herein.

In this embodiment of this application, the first indication information may be implemented in a plurality of manners. The following separately describes the plurality of manners.

In a first possible implementation, the DCI includes a first field, and the first field may be used to carry the first indication information.

In this implementation, when an idle state of the first field is a first preset state, the first indication information is used to: indicate the terminal device to initiate the random access and retransmit the uplink data, or indicate that the uplink data fails to be demodulated, or when an idle state of the first field is a second preset state, the first indication information is used to: indicate the terminal device to initiate the random access and retransmit the uplink data, or indicate that the uplink data fails to be demodulated, and indicate to deactivate the preconfigured resource; or when an idle state of the first field is a third preset state, the first indication information is used to: indicate the terminal device to initiate the random access and retransmit the uplink data, or indicate that the uplink data fails to be demodulated, and indicate to release the preconfigured resource; or when an idle state of the first field is a fourth preset state, the first indication information is used to: indicate the terminal device to initiate the EDT and retransmit the uplink data, or indicate that the uplink data fails to be demodulated; or when an idle state of the first field is a fifth preset state, the first indication information is used to: indicate the terminal device to initiate the EDT and retransmit the uplink data, or indicate that the uplink data fails to be demodulated, and indicate to deactivate the preconfigured resource; or when an idle state of the first field is a sixth preset state, the first indication information is used to: indicate the terminal device to initiate the EDT and retransmit the uplink data, or indicate that the uplink data fails to be demodulated, and indicate to release the preconfigured resource.

In this implementation, which field in the DCI is specifically the first field may be determined based on an actual situation. For example, in an NB-IoT system, when a format of the DCI is DCI format N0, for content included in the DCI, refer to Table 1.

TABLE 1

| Content (content) included in the DCI | Number of included bits |
|---|---|
| Flag for format N0/format N1 differentiation | 1 |
| Subcarrier indication (subcarrier indication) | 6 |
| Resource assignment (resource assignment) | 3 |
| Scheduling delay (scheduling delay) | 2 |
| Modulation and coding scheme (modulation and coding scheme) | 4 |
| Redundancy version (redundancy version) | 1 |
| Repetition number (repetition number) | 3 |
| New data indicator (new data indicator) | 1 |
| DCI subframe repetition number (DCI subframe repetition number) | 2 |

With reference to Table 1, when a format of the DCI is DCI format N0, the subcarrier indication field in the DCI includes six bits, and there are a plurality of idle states that are not used. Therefore, the subcarrier indication field may be used to carry the first indication information, in other words, the first field may be the subcarrier indication field.

According to the foregoing method, the subcarrier indication field in existing DCI format N0 is used to carry the first indication information, so that on a premise that the DCI is not changed, compatibility with an existing protocol can be implemented, and complexity of blindly detecting the DCI by the terminal device is not increased.

Further, when a format of the DCI is DCI format N0, before sending the DCI to the terminal device, the network device may further send a preamble index (preamble index) to the terminal device. The preamble index may be a contention-free (contention-free) preamble index. After the terminal device receives the preamble index, when it is determined, based on the first indication information, that the uplink data fails to be demodulated or the uplink data needs to be retransmitted, the terminal device may initiate the random access or the EDT to the network device based on a preamble indicated by the preamble index.

It should be noted that, in a current NB-IoT system, there are a plurality of preambles that can be used. These preambles may be divided into two orthogonal sets, and a preamble in one set is used to initiate random access, where the set is referred to as a set 1 hereinafter; a preamble in the other set is used to initiate EDT, where the set is referred to as a set 2 hereinafter.

If the preamble indicated by the preamble index sent by the network device is from the set 1, the terminal device may determine to initiate the random access based on the preamble indicated by the preamble index. If the preamble indicated by the preamble index sent by the network device is from the set 2, the terminal device may determine to initiate the EDT based on the preamble indicated by the preamble index.

In a second possible implementation, the DCI includes a second field and preamble indication information, the second field is used to carry the first indication information, and the preamble indication information is used to indicate a preamble.

In this implementation, when an idle state of the second field is a first preset state, the first indication information is used to: indicate the terminal device to initiate the random access or the EDT based on the preamble and retransmit the uplink data, or indicate that the uplink data fails to be demodulated: or when an idle state of the second field is a second preset state, the first indication information is used to: indicate the terminal device to initiate the random access or the EDT based on the preamble and retransmit the uplink data, or indicate that the uplink data fails to be demodulated, and indicate to deactivate the preconfigured resource; or when an idle state of the second field is a third preset state, the first indication information is used to: indicate the terminal device to initiate the random access or the EDT based on the preamble and retransmit the uplink data, or indicate that the uplink data fails to be demodulated, and indicate to release the preconfigured resource.

In this implementation, which field in the DCI is specifically the second field may be determined based on an actual situation. For example, in an NB-IoT system, when a format of the DCI is DCI format N1, for content included in the DCI, refer to Table 2.

TABLE 2

| Content included in the DCI | Number of included bits |
|---|---|
| Flag for format N0/format N1 differentiation | 1 |
| NPDCCH order indicator (NPDCCH order indicator) | 1 |
| Starting number of NPRACH repetitions (starting number of NPRACH repetitions) | 2 |
| Subcarrier indication of NPRACH (subcarrier indication of NPRACH) | 6 |
| Carrier indication of NPRACH (carrier indication of NPRACH) | 4 |
| Idle bit | 9 |

The NPDCCH is a narrowband physical downlink control channel (narrowband physical downlink control channel). The NPRACH is a narrowband physical random access channel (narrowband physical random access channel).

With reference to Table 2, when a format of the DCI is DCI format N1, the subcarrier indication of NPRACH field in the DCI includes six bits, and there are a plurality of idle states that are not used. Therefore, the subcarrier indication of NPRACH field may be used to carry the first indication information, in other words, the second field may be the subcarrier indication of NPRACH field.

According to the foregoing method, the subcarrier indication of NPRACH field in existing DCI format N1 is used to carry the first indication information, so that on a premise that the DCI is not changed, compatibility with an existing protocol can be implemented, and complexity of blindly detecting the DCI by the terminal device is not increased.

It should be noted that, in this embodiment of this application, the preamble indication information may be jointly indicated by using the following three fields in the DCI: the starting number of NPRACH repetitions field, the subcarrier indication of NPRACH field, and the carrier indication of NPRACH field.

The carrier indication of NPRACH field indicates an index of a carrier on which the preamble is located, the subcarrier indication of NPRACH field indicates an index of a subcarrier on which the preamble is located, and the starting number of NPRACH repetitions field is used to indicate a quantity of transmission repetitions of the preamble.

In conclusion, the terminal device may determine, by using the foregoing three fields, information such as the carrier for sending the preamble, the subcarrier for sending the preamble, and the quantity of repetitions for sending the preamble.

It should be noted that, with reference to descriptions in the first possible implementation, in the current NB-IoT system, there are a plurality of preambles that can be used. These preambles may be divided into two orthogonal sets, and the two sets are separately a set 1 used to initiate random access and a set 2 used to initiate EDT.

If the preamble indicated by the preamble indication information in DCI format N1 is from the set 1, the terminal device may determine to initiate the random access based on the preamble indicated by the preamble indication information. If the preamble indicated by the preamble indication information in DCI format N1 is from the set 2, the terminal device may determine to initiate the EDT based on the preamble indicated by the preamble indication information.

In a third possible implementation, the DCI includes M idle bits and preamble indication information, N idle bits in the M idle bits are used to carry the first indication information, and the preamble indication information is used to indicate a preamble, where N is an integer greater than 0 and less than or equal to M, and M is an integer greater than 0.

In this implementation, when a value of the N idle bits is a first preset value, the first indication information is used to: indicate the terminal device to initiate the random access or the EDT based on the preamble and retransmit the uplink data, or indicate that the uplink data fails to be demodulated: or when a value of the N idle bits is a second preset value, the first indication information is used to: indicate the terminal device to initiate the random access or the EDT based on the preamble and retransmit the uplink data, or indicate that the uplink data fails to be demodulated, and indicate to deactivate the preconfigured resource; or when a value of the N idle bits is a third preset value, the first indication information is used to: indicate the terminal device to initiate the random access or the EDT based on the preamble and retransmit the uplink data, or indicate that the uplink data fails to be demodulated, and indicate to release the preconfigured resource.

With reference to Table 2, when a format of the DC is DCI format N1, M may be equal to 9, that is, the DCI includes nine idle bits, so that N idle bits in the nine idle bits may be used to carry the first indication information.

In a fourth possible implementation, a format of the DCI is a format other than DCI format N0 and DCI format N1, for example, may be a customized DCI format. In this case, to avoid increasing complexity of detecting DCI by the terminal device, DCI with the customized DCI format includes 23 bits, the same as DCI with DCI format N0 or DCI format N1. Certainly, the DCI with the customized DCI format may alternatively include another quantity of bits. Details are not described herein.

In this implementation, at least one bit in the DCI may be used to carry the first indication information. For a correspondence between a value of the at least one bit and the carried first indication information, refer to descriptions in the first to the third possible implementations. Details are not described herein again.

In the current technology, when a format of DCI is DCI format N0 or DCI format N1, the DCI is scrambled by using a cell radio network temporary identifier (cell radio network temporary identifier, C-RNTI). In this implementation, the DCI may be scrambled by using a radio network temporary identifier (radio network temporary identifier, RNTI) other than the C-RNTI.

In this embodiment of this application, in addition to the first indication information, the DCI may further include other information. For example, the DCI may include second indication information. The second indication information is used to indicate a timing advance (timing advance) TA of the terminal device. The TA is indicated to the terminal device, so that the terminal device can update the TA in time, thereby improving performance of uplink scheduling-free transmission, and avoiding an uplink scheduling-free transmission failure caused by a relatively large TA error.

The second indication information may indicate an increment of the TA, that is, an adjustment amount of a current TA of the terminal device relative to a previous TA. In this case, a relatively small quantity of bits may be used to carry the second indication information. For example, six bits may be used to carry the second indication information.

Alternatively, the second indication information may directly indicate the TA, that is, a current TA of the terminal device. In this case, the terminal device may directly obtain the TA based on the second indication information, and a relatively large quantity of bits are required for carrying the second indication information, for example, 11 bits may be used to carry the second indication information.

Further, optionally, the DCI may further include third indication information. The third indication information is used to indicate a carrier used when the terminal device initiates the random access or the EDT. For example, in an NB-IoT system, when a format of the DCI is DCI format N1, the third indication information may be carried in the carrier indication of NPRACH field in the DCI.

In this embodiment of this application, after receiving the DCI, the terminal device performs a corresponding action based on the first indication information in the DCI.

For example, when the first indication information is used to: indicate the terminal device to initiate the random access and retransmit the uplink data, or indicate that the uplink data fails to be demodulated, the terminal device may initiate the random access, and retransmit the uplink data to the network device after accessing the network device through the random access.

Alternatively, when the first indication information is used to: indicate the terminal device to initiate the random access and retransmit the uplink data, or indicate that the uplink data fails to be demodulated, and indicate to deactivate the preconfigured resource, the terminal device may initiate the random access, and retransmit the uplink data to the network device and deactivate the preconfigured resource after accessing the network device through the random access.

Alternatively, when the first indication information is used to: indicate the terminal device to initiate the random access and retransmit the uplink data, or indicate that the uplink data fails to be demodulated, and indicate to release the preconfigured resource, the terminal device may initiate the random access, and retransmit the uplink data to the network device and release the preconfigured resource after accessing the network device through the random access.

Alternatively, when the first indication information is used to: indicate the terminal device to initiate the EDT and retransmit the uplink data, or indicate that the uplink data fails to be demodulated, the terminal device may initiate the EDT, and retransmit the uplink data to the network device in an EDT process.

Alternatively, when the first indication information is used to: indicate the terminal device to initiate the EDT and retransmit the uplink data, or indicate that the uplink data fails to be demodulated, and indicate to deactivate the preconfigured resource, the terminal device may initiate the EDT, and retransmit the uplink data to the network device and deactivate the preconfigured resource in an EDT process.

Alternatively, when the first indication information is used to: indicate the terminal device to initiate the EDT and retransmit the uplink data, or indicate that the uplink data fails to be demodulated, and indicate to release the preconfigured resource, the terminal device may initiate the EDT, and retransmit the uplink data to the network device and release the preconfigured resource in an EDT process.

When content indicated by the first indication information is another case, refer to the foregoing descriptions. Details are not described herein again.

In the foregoing process, a preamble used by the terminal device to initiate the random access or the EDT may be determined based on a preamble index sent by the network device, or may be determined based on preamble indication information in the DCI. For details, refer to the foregoing descriptions. Details are not described herein again.

It should be noted that when the first indication information is used to indicate the terminal device to initiate the random access or the EDT, the terminal device may alternatively determine, based on an actual situation, whether to initiate the random access or the EDT. In other words, the terminal device may alternatively initiate no random access or no EDT. Details are not described herein.

It should be noted that, as described above, this embodiment of this application may alternatively be applied to an eMTC system. When this embodiment of this application is applied to the eMTC system, a format of the DCI may be 6-0A, 6-0B, 6-1A, or the like, and the first indication information may be carried in an idle bit in the DCI, or is carried in a field in which there is an idle state. For details, refer to the foregoing descriptions. Details are not described herein again.

Figure 3:
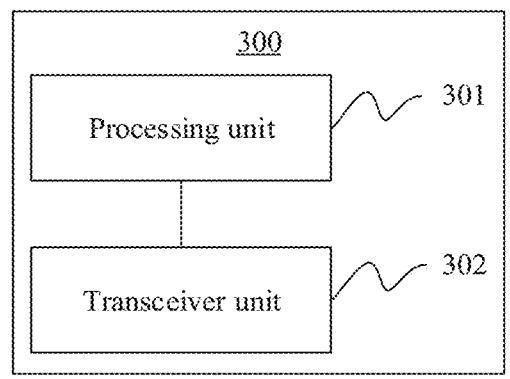
FIG. 3 is a schematic structural diagram of a communications apparatus according to an embodiment of this application.

FIG. 3 is a schematic structural diagram of a communications apparatus according to an embodiment of this application. The communications apparatus may be configured to perform actions of the network device in the foregoing method embodiment, and the communications apparatus 300 includes a processing unit 301 and a transceiver unit 302.

The processing unit 301 is configured to perform, on a preconfigured resource, data demodulation on uplink data sent by a terminal device.

The transceiver unit 302 is configured to send downlink control information DCI to the terminal device, where the DCI includes first indication information, and if the uplink data fails to be demodulated, or it is determined, based on a result of the data demodulation, that the terminal device needs to retransmit the uplink data, the first indication information is used to: indicate the terminal device to initiate random access or early data transmission EDT and retransmit the uplink data, or indicate that the uplink data fails to be demodulated; or if the uplink data is successfully demodulated, or it is determined, based on a result of the data demodulation, that the terminal device does not need to retransmit the uplink data, the first indication information is used to indicate the terminal device to release or deactivate the preconfigured resource.

In a possible design, if the uplink data fails to be demodulated, or it is determined, based on the result of the data demodulation, that the terminal device needs to retransmit the uplink data, the first indication information is further used to indicate the terminal device to release or deactivate the preconfigured resource.

In a possible design, the DCI includes a first field, and the first field is used to carry the first indication information: and when an idle state of the first field is a first preset state, the first indication information is used to: indicate the terminal device to initiate the random access and retransmit the uplink data, or indicate that the uplink data fails to be demodulated: or when an idle state of the first field is a second preset state, the first indication information is used to: indicate the terminal device to initiate the random access and retransmit the uplink data, or indicate that the uplink data fails to be demodulated, and indicate to deactivate the preconfigured resource; or when an idle state of the first field is a third preset state, the first indication information is used to: indicate the terminal device to initiate the random access and retransmit the uplink data, or indicate that the uplink data fails to be demodulated, and indicate to release the preconfigured resource; or when an idle state of the first field is a fourth preset state, the first indication information is used to: indicate the terminal device to initiate the EDT and retransmit the uplink data, or indicate that the uplink data fails to be demodulated; or when an idle state of the first field is a fifth preset state, the first indication information is used to: indicate the terminal device to initiate the EDT and retransmit the uplink data, or indicate that the uplink data fails to be demodulated, and indicate to deactivate the preconfigured resource; or when an idle state of the first field is a sixth preset state the first indication information is used to: indicate the terminal device to initiate the EDT and retransmit the uplink data, or indicate that the uplink data fails to be demodulated, and indicate to release the preconfigured resource.

In a possible design, a format of the DCI is DCI format NO, and the first field is a subcarrier indication field.

In a possible design, the DCI includes a second field and preamble indication information, the second field is used to carry the first indication information, and the preamble indication information is used to indicate a preamble; and when an idle state of the second field is a first preset state, the first indication information is used to: indicate the terminal device to initiate the random access or the EDT based on the preamble and retransmit the uplink data, or indicate that the uplink data fails to be demodulated; or when an idle state of the second field is a second preset state, the first indication information is used to: indicate the terminal device to initiate the random access or the EDT based on the preamble and retransmit the uplink data, or indicate that the uplink data fails to be demodulated, and indicate to deactivate the preconfigured resource; or when an idle state of the second field is a third preset state, the first indication information is used to: indicate the terminal device to initiate the random access or the EDT based on the preamble and retransmit the uplink data, or indicate that the uplink data fails to be demodulated, and indicate to release the preconfigured resource.

In a possible design, the DCI includes M idle bits and preamble indication information, N idle bits in the M idle bits are used to carry the first indication information, and the preamble indication information is used to indicate a preamble, where N is an integer greater than 0 and less than or equal to M, and M is an integer greater than 0; and when a value of the N idle bits is a first preset value, the first indication information is used to: indicate the terminal device to initiate the random access or the EDT based on the preamble and retransmit the uplink data, or indicate that the uplink data fails to be demodulated; or when a value of the N idle bits is a second preset value, the first indication information is used to: indicate the terminal device to initiate the random access or the EDT based on the preamble and retransmit the uplink data, or indicate that the uplink data fails to be demodulated, and indicate to deactivate the preconfigured resource; or when a value of the N idle bits is a third preset value, the first indication information is used to: indicate the terminal device to initiate the random access or the EDT based on the preamble and retransmit the uplink data, or indicate that the uplink data fails to be demodulated, and indicate to release the preconfigured resource.

In a possible design, a format of the DCI is DCI format N1, and the second field is a subcarrier indication of narrowband physical random access channel NPRACH field.

In a possible design, the DCI further includes second indication information, and the second indication information is used to indicate a timing advance TA of the terminal device.

In a possible design, the DCI further includes third indication information, and the third indication information is used to indicate a carrier used when the terminal device initiates the random access or the EDT.

In a possible design, a format of the DCI is a format other than DCI format N0 and DCI format N1.

In a possible design, the DCI is scrambled by using an RNTI other than a C-RNTI.

Figure 4:
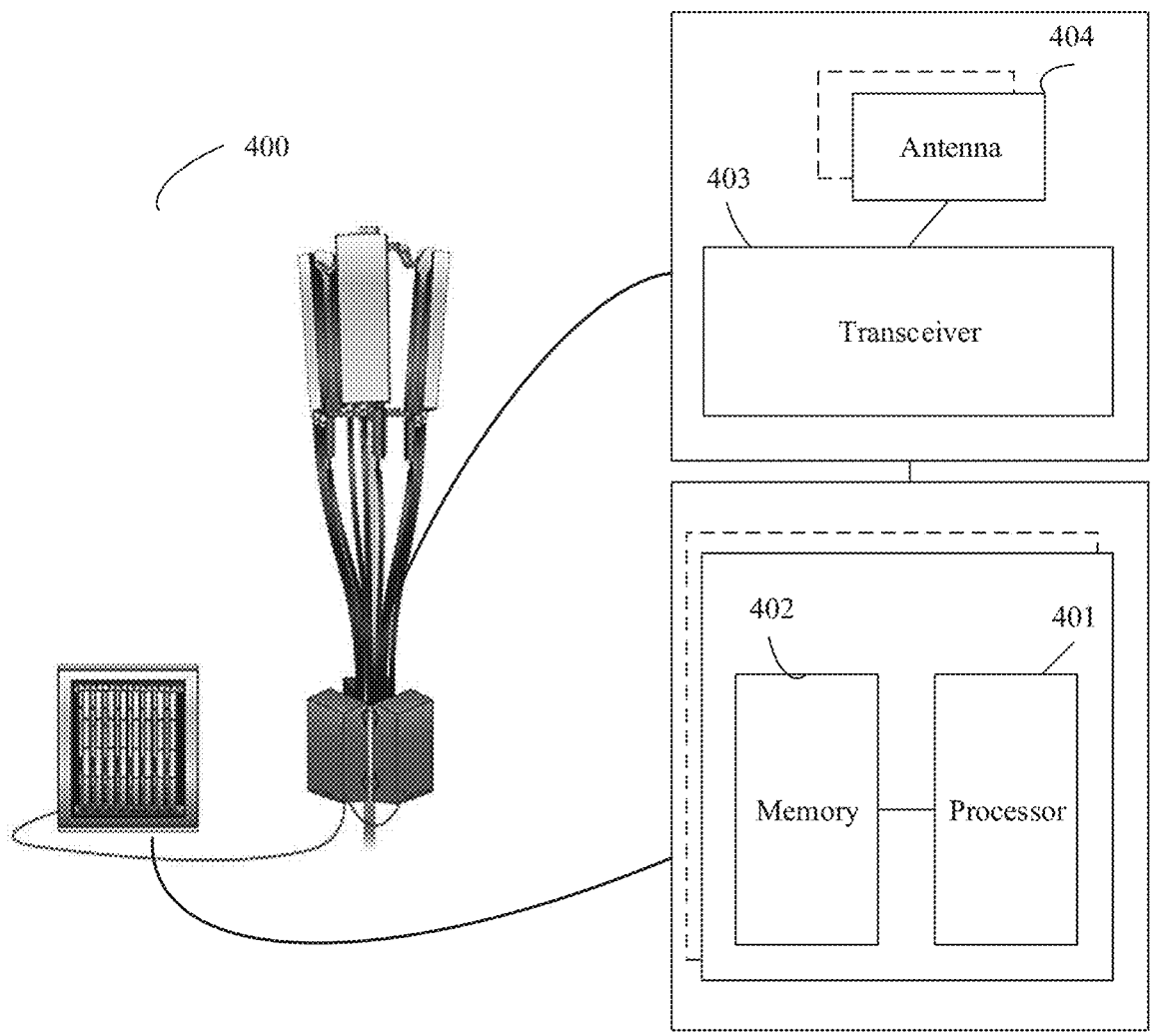
FIG. 4 is a schematic structural diagram of a communications apparatus according to an embodiment of this application.

FIG. 4 is a schematic structural diagram of a communications apparatus according to an embodiment of this application. The communications apparatus shown in FIG. 4 may be an implementation of a hardware circuit of the communications apparatus shown in FIG. 3. The communications apparatus may be applicable to the flowchart shown in FIG. 2, and the communications apparatus performs functions of the network device in the foregoing method embodiment. For ease of description, FIG. 4 shows only main components of the communications apparatus. Optionally, the communications apparatus may be a network device, or may be an apparatus, for example, a chip or a chip system, in a network device. The chip system includes at least one chip, and the chip system may further include another circuit structure and/or discrete component. Optionally, that the communications apparatus is the network device is used as an example. As shown in FIG. 4, the communications apparatus 400 includes a processor 401, a memory 402, a transceiver 403, and an antenna 404.

The processor 401 is configured to perform, on a preconfigured resource, data demodulation on uplink data sent by a terminal device.

The transceiver 403 is configured to send downlink control information DCI to the terminal device, where the DCI includes first indication information, and if the uplink data fails to be demodulated, or it is determined, based on a result of the data demodulation, that the terminal device needs to retransmit the uplink data, the first indication information is used to: indicate the terminal device to initiate random access or early data transmission EDT and retransmit the uplink data, or indicate that the uplink data fails to be demodulated; or if the uplink data is successfully demodulated, or it is determined, based on a result of the data demodulation, that the terminal device does not need to retransmit the uplink data, the first indication information is used to indicate the terminal device to release or deactivate the preconfigured resource.

In a possible design, if the uplink data fails to be demodulated, or it is determined, based on the result of the data demodulation, that the terminal device needs to retransmit the uplink data, the first indication information is further used to indicate the terminal device to release or deactivate the preconfigured resource.

In a possible design, the DCI includes a first field, and the first field is used to carry the first indication information: and when an idle state of the first field is a first preset state, the first indication information is used to: indicate the terminal device to initiate the random access and retransmit the uplink data, or indicate that the uplink data fails to be demodulated: or when an idle state of the first field is a second preset state, the first indication information is used to: indicate the terminal device to initiate the random access and retransmit the uplink data, or indicate that the uplink data fails to be demodulated, and indicate to deactivate the preconfigured resource: or when an idle state of the first field is a third preset state, the first indication information is used to: indicate the terminal device to initiate the random access and retransmit the uplink data, or indicate that the uplink data fails to be demodulated, and indicate to release the preconfigured resource: or when an idle state of the first field is a fourth preset state, the first indication information is used to: indicate the terminal device to initiate the EDT and retransmit the uplink data, or indicate that the uplink data fails to be demodulated: or when an idle state of the first field is a fifth preset state, the first indication information is used to: indicate the terminal device to initiate the EDT and retransmit the uplink data, or indicate that the uplink data fails to be demodulated, and indicate to deactivate the preconfigured resource: or when an idle state of the first field is a sixth preset state, the first indication information is used to: indicate the terminal device to initiate the EDT and retransmit the uplink data, or indicate that the uplink data fails to be demodulated, and indicate to release the preconfigured resource.

In a possible design, a format of the DCI is DCI format N0, and the first field is a subcarrier indication field.

In a possible design, the DCI includes a second field and preamble indication information, the second field is used to carry the first indication information, and the preamble indication information is used to indicate a preamble: and when an idle state of the second field is a first preset state, the first indication information is used to: indicate the terminal device to initiate the random access or the EDT based on the preamble and retransmit the uplink data, or indicate that the uplink data fails to be demodulated; or when an idle state of the second field is a second preset state, the first indication information is used to: indicate the terminal device to initiate the random access or the EDT based on the preamble and retransmit the uplink data, or indicate that the uplink data fails to be demodulated, and indicate to deactivate the preconfigured resource: or when an idle state of the second field is a third preset state, the first indication information is used to: indicate the terminal device to initiate the random access or the EDT based on the preamble and retransmit the uplink data, or indicate that the uplink data fails to be demodulated, and indicate to release the preconfigured resource.

In a possible design, the DCI includes M idle bits and preamble indication information, N idle bits in the M idle bits are used to carry the first indication information, and the preamble indication information is used to indicate a preamble, where N is an integer greater than 0 and less than or equal to M, and M is an integer greater than 0; and when a value of the N idle bits is a first preset value, the first indication information is used to: indicate the terminal device to initiate the random access or the EDT based on the preamble and retransmit the uplink data, or indicate that the uplink data fails to be demodulated; or when a value of the N idle bits is a second preset value, the first indication information is used to: indicate the terminal device to initiate the random access or the EDT based on the preamble and retransmit the uplink data, or indicate that the uplink data fails to be demodulated, and indicate to deactivate the preconfigured resource; or when a value of the N idle bits is a third preset value, the first indication information is used to: indicate the terminal device to initiate the random access or the EDT based on the preamble and retransmit the uplink data, or indicate that the uplink data fails to be demodulated, and indicate to release the preconfigured resource.

In a possible design, a format of the DCI is DCI format N1, and the second field is a subcarrier indication of narrowband physical random access channel NPRACH field.

In a possible design, the DCI further includes second indication information, and the second indication information is used to indicate a timing advance TA of the terminal device.

In a possible design, the DCI further includes third indication information, and the third indication information is used to indicate a carrier used when the terminal device initiates the random access or the EDT.

In a possible design, a format of the DCI is a format other than DCI format NO and DCI format N1.

In a possible design, the DCI is scrambled by using an RNTI other than a C-RNTI.

Figure 5:
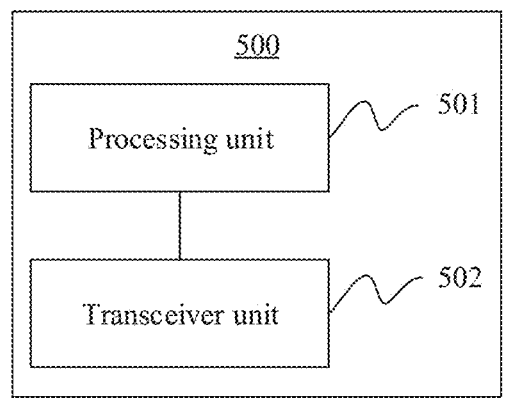
FIG. 5 is a schematic structural diagram of a communications apparatus according to an embodiment of this application.

FIG. 5 is a schematic structural diagram of a communications apparatus according to an embodiment of this application. The communications apparatus may be configured to perform actions of the terminal device in the foregoing method embodiment, and the communications apparatus 500 includes a processing unit 501 and a transceiver unit 502.

The transceiver unit 502 is configured to send uplink data on a preconfigured resource.

The processing unit 501 is configured to receive downlink control information DCI sent by a network device, where the DCI includes first indication information, and if the uplink data fails to be demodulated, or it is determined, based on a result of data demodulation, that the terminal device needs to retransmit the uplink data, the first indication information is used to: indicate the terminal device to initiate random access or early data transmission EDT and retransmit the uplink data, or indicate that the uplink data fails to be demodulated; or if the uplink data is successfully demodulated, or it is determined, based on a result of data demodulation, that the terminal device does not need to retransmit the uplink data, the first indication information is used to indicate the terminal device to release or deactivate the preconfigured resource.

In a possible design, before the downlink control information DCI sent by the network device is received, the transceiver unit 502 is further configured to:

receive a preamble index sent by the network device.

After the downlink control information DC sent by the network device is received, the processing unit 501 is further configured to: if the uplink data fails to be demodulated, or it is determined, based on the result of the data demodulation, that the terminal device needs to retransmit the uplink data, initiate the random access or the EDT to the network device based on the preamble index.

In a possible design, if the uplink data fails to be demodulated, or it is determined, based on the result of the data demodulation, that the terminal device needs to retransmit the uplink data, the first indication information is further used to indicate the terminal device to release or deactivate the preconfigured resource.

In a possible design, the DCI includes a first field, and the first field is used to carry the first indication information; and when an idle state of the first field is a first preset state, the first indication information is used to: indicate the terminal device to initiate the random access and retransmit the uplink data, or indicate that the uplink data fails to be demodulated; or when an idle state of the first field is a second preset state, the first indication information is used to: indicate the terminal device to initiate the random access and retransmit the uplink data, or indicate that the uplink data fails to be demodulated, and indicate to deactivate the preconfigured resource: or when an idle state of the first field is a third preset state, the first indication information is used to: indicate the terminal device to initiate the random access and retransmit the uplink data, or indicate that the uplink data fails to be demodulated, and indicate to release the preconfigured resource; or when an idle state of the first field is a fourth preset state, the first indication information is used to: indicate the terminal device to initiate the EDT and retransmit the uplink data, or indicate that the uplink data fails to be demodulated; or when an idle state of the first field is a fifth preset state, the first indication information is used to: indicate the terminal device to initiate the EDT and retransmit the uplink data, or indicate that the uplink data fails to be demodulated, and indicate to deactivate the preconfigured resource; or when an idle state of the first field is a sixth preset state, the first indication information is used to: indicate the terminal device to initiate the EDT and retransmit the uplink data, or indicate that the uplink data fails to be demodulated, and indicate to release the preconfigured resource.

In a possible design, a format of the DCI is DCI format NO, and the first field is a subcarrier indication field.

In a possible design, the DCI includes a second field and preamble indication information, the second field is used to carry the first indication information, and the preamble indication information is used to indicate a preamble; and when an idle state of the second field is a first preset state, the first indication information is used to: indicate the terminal device to initiate the random access or the EDT based on the preamble and retransmit the uplink data, or indicate that the uplink data fails to be demodulated; or when an idle state of the second field is a second preset state, the first indication information is used to: indicate the terminal device to initiate the random access or the EDT based on the preamble and retransmit the uplink data, or indicate that the uplink data fails to be demodulated, and indicate to deactivate the preconfigured resource: or when an idle state of the second field is a third preset state, the first indication information is used to: indicate the terminal device to initiate the random access or the EDT based on the preamble and retransmit the uplink data, or indicate that the uplink data fails to be demodulated, and indicate to release the preconfigured resource.

In a possible design, the DCI includes M idle bits and preamble indication information. N idle bits in the M idle bits are used to carry the first indication information, and the preamble indication information is used to indicate a preamble, where N is an integer greater than 0 and less than or equal to M, and M is an integer greater than 0; and when a value of the N idle bits is a first preset value, the first indication information is used to: indicate the terminal device to initiate the random access or the EDT based on the preamble and retransmit the uplink data, or indicate that the uplink data fails to be demodulated; or when a value of the N idle bits is a second preset value, the first indication information is used to: indicate the terminal device to initiate the random access or the EDT based on the preamble and retransmit the uplink data, or indicate that the uplink data fails to be demodulated, and indicate to deactivate the preconfigured resource; or when a value of the N idle bits is a third preset value, the first indication information is used to, indicate the terminal device to initiate the random access or the EDT based on the preamble and retransmit the uplink data, or indicate that the uplink data fails to be demodulated, and indicate to release the preconfigured resource.

In a possible design, a format of the DCI is DCI format N1, and the second field is a subcarrier indication of narrowband physical random access channel NPRACH field.

In a possible design, the DCI further includes second indication information, and the second indication information is used to indicate a timing advance TA of the terminal device.

In a possible design, the DCI further includes third indication information, and the third indication information is used to indicate a carrier used when the terminal device initiates the random access or the EDT.

In a possible design, a format of the DCI is a format other than DCI format N0 and DCI format N1.

In a possible design, the DCI is scrambled by using an RNTI other than a C-RNTI.

Figure 6:
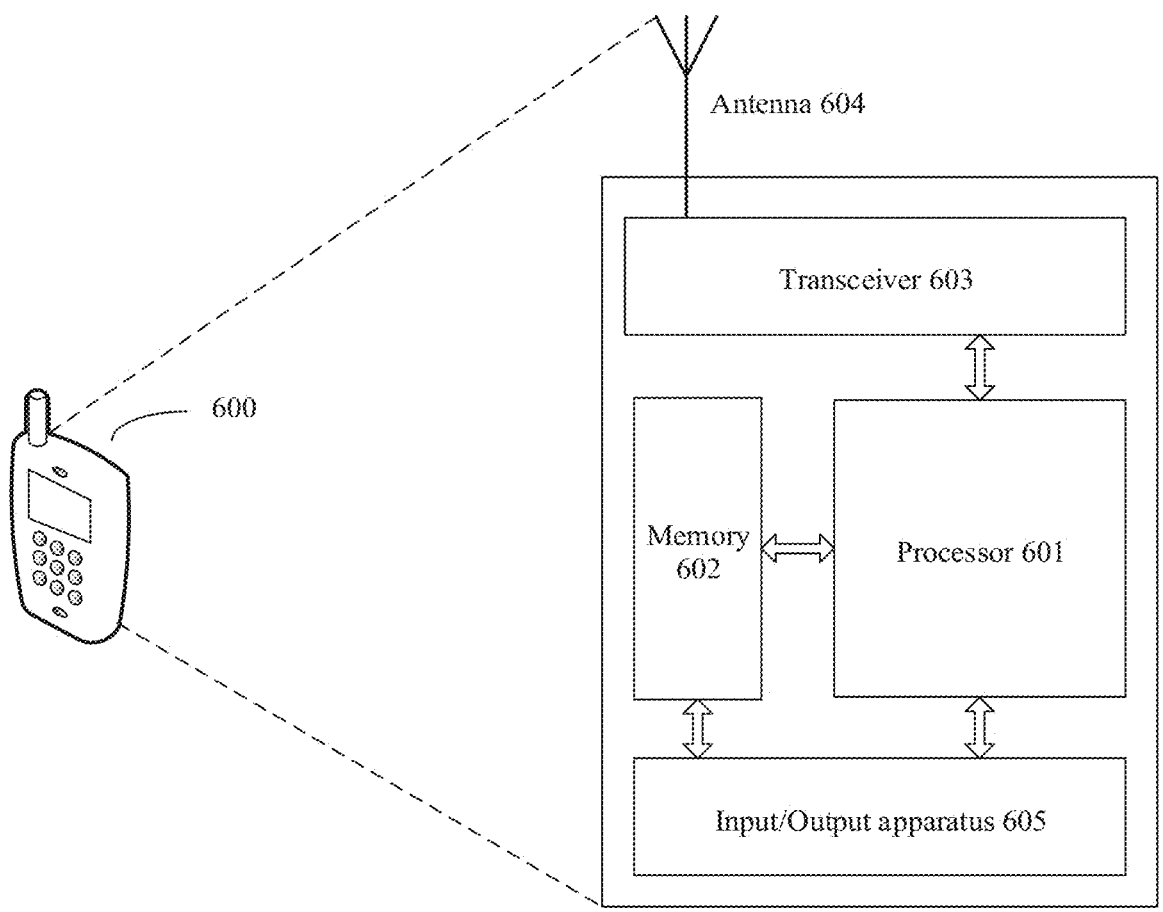
FIG. 6 is a schematic structural diagram of a communications apparatus according to an embodiment of this application.

FIG. 6 is a schematic structural diagram of a communications apparatus according to an embodiment of this application. The communications apparatus shown in FIG. 6 may be an implementation of a hardware circuit of the communications apparatus shown in FIG. 5. The communications apparatus may be applicable to the flowchart shown in FIG. 2, and the communications apparatus performs functions of the terminal device in the foregoing method embodiment. For ease of description, FIG. 6 shows only main components of the communications apparatus. Optionally, the communications apparatus may be a terminal device, or may be an apparatus, for example, a chip or a chip system, in a terminal device. The chip system includes at least one chip, and the chip system may further include another circuit structure and/or discrete component. Optionally, that the communications apparatus is the terminal device is used as an example. As shown in FIG. 6, the communications apparatus 600 includes a processor 601, a memory 602, a transceiver 603, an antenna 604, and an input/output apparatus 605. The processor 601 is mainly configured to: process a communication protocol and communication data; control the entire wireless communications apparatus; execute a software program; and process data of the software program. For example, the processor 601 is configured to support the wireless communications apparatus in performing actions described in the foregoing method embodiment. The memory 602 is mainly configured to store the software program and data. The transceiver 603 is mainly configured to: perform conversion between a baseband signal and a radio frequency signal and processing of the radio frequency signal. The antenna 604 is mainly configured to receive and send a radio frequency signal in a form of an electromagnetic wave. The input/output apparatus 605, such as a touchscreen, a display screen, or a keyboard, is mainly configured to receive data input by a user and output data to the user.

The transceiver 603 is configured to send uplink data on a preconfigured resource.

The processor 601 is configured to receive downlink control information DCI sent by a network device, where the DCI includes first indication information, and if the uplink data fails to be demodulated, or it is determined, based on a result of data demodulation, that the terminal device needs to retransmit the uplink data, the first indication information is used to: indicate the terminal device to initiate random access or early data transmission EDT and retransmit the uplink data, or indicate that the uplink data fails to be demodulated; or if the uplink data is successfully demodulated, or it is determined, based on a result of data demodulation, that the terminal device does not need to retransmit the uplink data, the first indication information is used to indicate the terminal device to release or deactivate the preconfigured resource.

In a possible design, before the downlink control information DCI sent by the network device is received, the transceiver 603 is further configured to:

receive a preamble index sent by the network device.

After the downlink control information DCI sent by the network device is received, the processor 601 is further configured to: if the uplink data fails to be demodulated, or it is determined, based on the result of the data demodulation, that the terminal device needs to retransmit the uplink data, initiate the random access or the EDT to the network device based on the preamble index.

In a possible design, if the uplink data fails to be demodulated, or it is determined, based on the result of the data demodulation, that the terminal device needs to retransmit the uplink data, the first indication information is further used to indicate the terminal device to release or deactivate the preconfigured resource.

In a possible design, the DCI includes a first field, and the first field is used to carry the first indication information; and when an idle state of the first field is a first preset state, the first indication information is used to: indicate the terminal device to initiate the random access and retransmit the uplink data, or indicate that the uplink data fails to be demodulated; or when an idle state of the first field is a second preset state, the first indication information is used to: indicate the terminal device to initiate the random access and retransmit the uplink data, or indicate that the uplink data fails to be demodulated, and indicate to deactivate the preconfigured resource; or when an idle state of the first field is a third preset state, the first indication information is used to: indicate the terminal device to initiate the random access and retransmit the uplink data, or indicate that the uplink data fails to be demodulated, and indicate to release the preconfigured resource; or when an idle state of the first field is a fourth preset state the first indication information is used to: indicate the terminal device to initiate the EDT and retransmit the uplink data, or indicate that the uplink data fails to be demodulated; or when an idle state of the first field is a fifth preset state, the first indication information is used to: indicate the terminal device to initiate the EDT and retransmit the uplink data, or indicate that the uplink data fails to be demodulated, and indicate to deactivate the preconfigured resource; or when an idle state of the first field is a sixth preset state, the first indication information is used to: indicate the terminal device to initiate the EDT and retransmit the uplink data, or indicate that the uplink data fails to be demodulated, and indicate to release the preconfigured resource.

In a possible design, a format of the DCI is DCI format N0, and the first field is a subcarrier indication field.

In a possible design, the DCI includes a second field and preamble indication information, the second field is used to carry the first indication information, and the preamble indication information is used to indicate a preamble; and when an idle state of the second field is a first preset state, the first indication information is used to: indicate the terminal device to initiate the random access or the EDT based on the preamble and retransmit the uplink data, or indicate that the uplink data fails to be demodulated; or when an idle state of the second field is a second preset state, the first indication information is used to: indicate the terminal device to initiate the random access or the EDT based on the preamble and retransmit the uplink data, or indicate that the uplink data fails to be demodulated, and indicate to deactivate the preconfigured resource: or when an idle state of the second field is a third preset state, the first indication information is used to: indicate the terminal device to initiate the random access or the EDT based on the preamble and retransmit the uplink data, or indicate that the uplink data fails to be demodulated, and indicate to release the preconfigured resource.

In a possible design, the DCI includes M idle bits and preamble indication information, N idle bits in the M idle bits are used to carry the first indication information, and the preamble indication information is used to indicate a preamble, where N is an integer greater than 0 and less than or equal to M. and M is an integer greater than 0; and when a value of the N idle bits is a first preset value, the first indication information is used to: indicate the terminal device to initiate the random access or the EDT based on the preamble and retransmit the uplink data, or indicate that the uplink data fails to be demodulated; or when a value of the N idle bits is a second preset value, the first indication information is used to: indicate the terminal device to initiate the random access or the EDT based on the preamble and retransmit the uplink data, or indicate that the uplink data fails to be demodulated, and indicate to deactivate the preconfigured resource; or when a value of the N idle bits is a third preset value, the first indication information is used to: indicate the terminal device to initiate the random access or the EDT based on the preamble and retransmit the uplink data, or indicate that the uplink data fails to be demodulated, and indicate to release the preconfigured resource.

In a possible design, a format of the DCI is DCI format N1, and the second field is a subcarrier indication of narrowband physical random access channel NPRACH field.

In a possible design, the DCI further includes second indication information, and the second indication information is used to indicate a timing advance TA of the terminal device.

In a possible design, the DCI further includes third indication information, and the third indication information is used to indicate a carrier used when the terminal device initiates the random access or the EDT.

In a possible design, a format of the DCI is a format other than DCI format N0 and DCI format N1.

In a possible design, the DCI is scrambled by using an RNTI other than a C-RNTI.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Clearly, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
   performing, by a network device on a preconfigured resource, data demodulation on uplink data sent by a terminal device; and
   sending, by the network device, downlink control information (DCI) to the terminal device, wherein the DCI comprises first indication information, and wherein:
   if the uplink data fails to be demodulated, the first indication information indicates that the uplink data fails to be demodulated, and wherein the DCI further comprises second indication information, and the second indication information indicates a timing advance (TA) of the terminal device.

2. The method according to claim 1, wherein if the uplink data fails to be demodulated, or it is determined, based on a result of the data demodulation, that the terminal device needs to retransmit the uplink data, the first indication information further indicates the terminal device to release or deactivate the preconfigured resource.

3. The method according to claim 1, wherein the DCI comprises a first field, wherein the first field carries the first indication information, and wherein:
when an idle state of the first field is a first preset state, the first indication information indicates the terminal device to initiate random access and retransmit the uplink data, or indicates that the uplink data fails to be demodulated; or
when an idle state of the first field is a second preset state, the first indication information indicates the terminal device to initiate the random access and retransmit the uplink data, or indicates that the uplink data fails to be demodulated, and indicates to deactivate the preconfigured resource; or
when an idle state of the first field is a third preset state, the first indication information indicates the terminal device to initiate the random access and retransmit the uplink data, or indicates that the uplink data fails to be demodulated, and indicates to release the preconfigured resource; or
when an idle state of the first field is a fourth preset state, the first indication information indicates the terminal device to initiate early data transmission (EDT) and retransmit the uplink data, or indicates that the uplink data fails to be demodulated; or
when an idle state of the first field is a fifth preset state, the first indication information indicates the terminal device to initiate the EDT and retransmit the uplink data, or indicates that the uplink data fails to be demodulated, and indicates to deactivate the preconfigured resource; or
when an idle state of the first field is a sixth preset state, the first indication information indicates the terminal device to initiate the EDT and retransmit the uplink data, or indicates that the uplink data fails to be demodulated, and indicates to release the preconfigured resource.

4. The method according to claim 1, wherein the DCI comprises a second field and preamble indication information, the second field carries the first indication information, and the preamble indication information indicates a preamble, and wherein:
when an idle state of the second field is a first preset state, the first indication information indicates the terminal device to initiate random access or EDT based on the preamble and retransmit the uplink data, or indicates that the uplink data fails to be demodulated; or
when an idle state of the second field is a second preset state, the first indication information indicates the terminal device to initiate the random access or the EDT based on the preamble and retransmit the uplink data, or indicates that the uplink data fails to be demodulated, and indicates to deactivate the preconfigured resource; or
when an idle state of the second field is a third preset state, the first indication information indicates the terminal device to initiate the random access or the EDT based on the preamble and retransmit the uplink data, or indicates that the uplink data fails to be demodulated, and indicates to release the preconfigured resource.

5. The method according to claim 1, wherein the DCI comprises M idle bits and preamble indication information, N idle bits in the M idle bits carry the first indication information, and the preamble indication information indicates a preamble, wherein N is an integer greater than 0 and less than or equal to M, and M is an integer greater than 0, and wherein:
when a value of the N idle bits is a first preset value, the first indication information indicates the terminal device to initiate random access or EDT based on the preamble and retransmit the uplink data, or indicates that the uplink data fails to be demodulated; or
when a value of the N idle bits is a second preset value, the first indication information indicates the terminal device to initiate the random access or the EDT based on the preamble and retransmit the uplink data, or indicates that the uplink data fails to be demodulated, and indicates to deactivate the preconfigured resource; or
when a value of the N idle bits is a third preset value, the first indication information indicates the terminal device to initiate the random access or the EDT based on the preamble and retransmit the uplink data, or indicates that the uplink data fails to be demodulated, and indicates to release the preconfigured resource.

6. The method according to claim 1, wherein the DCI further comprises third indication information, and wherein the third indication information indicates a carrier used when the terminal device initiates random access or EDT.

7. A communication method, comprising:
sending, by a terminal device, uplink data on a preconfigured resource;
receiving, by the terminal device, downlink control information (DCI) sent by a network device, wherein the DCI comprises first indication information, and wherein:
if the uplink data fails to be demodulated, the first indication information indicates that the uplink data fails to be demodulated, and wherein the DCI further comprises second indication information, and the second indication information indicates a timing advance (TA) of the terminal device;
and
performing process, by the terminal device, according to the DCI.

8. The method according to claim 7, wherein:
before the receiving, by the terminal device, downlink control information (DCI) sent by a network device, the method further comprises:
receiving, by the terminal device, a preamble index sent by the network device; and
after the receiving, by the terminal device, downlink control information (DCI) sent by a network device, the method further comprises:
if the uplink data fails to be demodulated, or it is determined, based on a result of the data demodulation, that the terminal device needs to retransmit the uplink data, initiating, by the terminal device, random access or early data transmission (EDT) to the network device based on the preamble index.

9. The method according to claim 7, wherein if the uplink data fails to be demodulated, or it is determined, based on a result of the data demodulation, that the terminal device needs to retransmit the uplink data, the first indication information further indicates the terminal device to release or deactivate the preconfigured resource.

10. The method according to claim 7, wherein the DCI comprises a first field, wherein the first field carries the first indication information, and wherein:
when an idle state of the first field is a first preset state, the first indication information indicates the terminal device to initiate random access and retransmit the uplink data, or indicates that the uplink data fails to be demodulated; or when an idle state of the first field is a second preset state, the first indication information indicates the terminal device to initiate the random access and retransmit the uplink data, or indicates that the uplink data fails to be demodulated, and indicates to deactivate the preconfigured resource; or when an idle state of the first field is a third preset state, the first indication information indicates the terminal device to initiate the random access and retransmit the uplink data, or indicates that the uplink data fails to be demodulated, and indicates to release the preconfigured resource; or when an idle state of the first field is a fourth preset state, the first indication information indicates the terminal device to initiate EDT and retransmit the uplink data, or indicates that the uplink data fails to be demodulated; or when an idle state of the first field is a fifth preset state, the first indication information indicates the terminal device to initiate the EDT and retransmit the uplink data, or indicates that the uplink data fails to be demodulated, and indicates to deactivate the preconfigured resource; or when an idle state of the first field is a sixth preset state, the first indication information indicates the terminal device to initiate the EDT and retransmit the uplink data, or indicates that the uplink data fails to be demodulated, and indicates to release the preconfigured resource.

11. The method according to claim 7, wherein the DCI comprises a second field and preamble indication information, the second field carries the first indication information, and the preamble indication information indicates a preamble, and wherein:

when an idle state of the second field is a first preset state, the first indication information indicates the terminal device to initiate random access or EDT based on the preamble and retransmit the uplink data, or indicates that the uplink data fails to be demodulated; or when an idle state of the second field is a second preset state, the first indication information indicates the terminal device to initiate the random access or the EDT based on the preamble and retransmit the uplink data, or indicates that the uplink data fails to be demodulated, and indicates to deactivate the preconfigured resource; or when an idle state of the second field is a third preset state, the first indication information indicates the terminal device to initiate the random access or the EDT based on the preamble and retransmit the uplink data, or indicates that the uplink data fails to be demodulated, and indicates to release the preconfigured resource.

12. The method according to claim 7, wherein the DCI comprises M idle bits and preamble indication information, N idle bits in the M idle bits carry the first indication information, and the preamble indication information indicates a preamble, wherein N is an integer greater than 0 and less than or equal to M, and M is an integer greater than 0, and wherein:

when a value of the N idle bits is a first preset value, the first indication information indicates the terminal device to initiate random access or EDT based on the preamble and retransmit the uplink data, or indicates that the uplink data fails to be demodulated; or when a value of the N idle bits is a second preset value, the first indication information indicates the terminal device to initiate the random access or the EDT based on the preamble and retransmit the uplink data, or indicates that the uplink data fails to be demodulated, and indicates to deactivate the preconfigured resource; or when a value of the N idle bits is a third preset value, the first indication information indicates the terminal device to initiate the random access or the EDT based on the preamble and retransmit the uplink data, or indicates that the uplink data fails to be demodulated, and indicates to release the preconfigured resource.

13. A communications apparatus, comprising:
at least one processor;
one or more memories coupled to the at least one processor and storing programming instructions for execution by the at least one processor to:
 perform, on a preconfigured resource, data demodulation on uplink data received from a terminal device; and
 send downlink control information (DCI) to the terminal device, wherein the DCI comprises first indication information, and wherein:
  if the uplink data fails to be demodulated, the first indication information indicates that the uplink data fails to be demodulated, and wherein the DCI further comprises second indication information, and the second indication information indicates a timing advance (TA) of the terminal device.

14. The apparatus according to claim 13, wherein the DCI comprises a first field, wherein the first field carries the first indication information, and wherein:

when an idle state of the first field is a first preset state, the first indication information: indicates the terminal device to initiate random access and retransmit the uplink data, or indicates that the uplink data fails to be demodulated; or when an idle state of the first field is a second preset state, the first indication information indicates the terminal device to initiate the random access and retransmit the uplink data, or indicates that the uplink data fails to be demodulated, and indicates to deactivate the preconfigured resource; or when an idle state of the first field is a third preset state, the first indication information indicates the terminal device to initiate the random access and retransmit the uplink data, or indicates that the uplink data fails to be demodulated, and indicates to release the preconfigured resource; or when an idle state of the first field is a fourth preset state, the first indication information indicates the terminal device to initiate early data transmission (EDT) and retransmit the uplink data, or indicates that the uplink data fails to be demodulated; or when an idle state of the first field is a fifth preset state, the first indication information indicates the terminal device to initiate the EDT and retransmit the uplink data, or indicates that the uplink data fails to be demodulated, and indicates to deactivate the preconfigured resource; or when an idle state of the first field is a sixth preset state, the first indication information indicates the terminal device to initiate the EDT and retransmit the uplink data, or indicates that the uplink data fails to be demodulated, and indicates to release the preconfigured resource.

15. The apparatus according to claim 13, wherein the DCI comprises a second field and preamble indication information, the second field carries the first indication information, and the preamble indication information indicates a preamble, and wherein:

when an idle state of the second field is a first preset state, the first indication information indicates the terminal device to initiate random access or EDT based on the preamble and retransmit the uplink data, or indicates that the uplink data fails to be demodulated; or when an idle state of the second field is a second preset state, the first indication information indicates the terminal device to initiate the random access or the EDT based on the preamble and retransmit the uplink data, or indicates that the uplink data fails to be demodulated, and indicates to deactivate the preconfigured resource; or when an idle state of the second field is a third preset state, the first indication information indicates the terminal device to initiate the random access or the EDT based on the preamble and retransmit the uplink data, or indicates that the uplink data fails to be demodulated, and indicates to release the preconfigured resource.

16. The apparatus according to claim 13, wherein the DCI comprises M idle bits and preamble indication information, N idle bits in the M idle bits carry the first indication information, and the preamble indication information indicates a preamble, wherein N is an integer greater than 0 and less than or equal to M, and M is an integer greater than 0, and wherein:

when a value of the N idle bits is a first preset value, the first indication information indicates the terminal device to initiate random access or EDT based on the preamble and retransmit the uplink data, or indicates that the uplink data fails to be demodulated; or when a value of the N idle bits is a second preset value, the first indication information indicates the terminal device to initiate the random access or the EDT based on the preamble and retransmit the uplink data, or indicates that the uplink data fails to be demodulated, and indicates to deactivate the preconfigured resource; or when a value of the N idle bits is a third preset value, the first indication information indicates the terminal device to initiate the random access or the EDT based on the preamble and retransmit the uplink data, or indicates that the uplink data fails to be demodulated, and indicates to release the preconfigured resource.

17. A communications apparatus, comprising:
at least one processor;
one or more memories coupled to the at least one processor and storing programming instructions for execution by the at least one processor to:
send uplink data on a preconfigured resource; and
receive downlink control information (DCI) sent by a network device, and perform process according to the DCI, wherein the DCI comprises first indication information, and wherein:
if the uplink data fails to be demodulated, the first indication information indicates that the uplink data fails to be demodulated, and wherein the DCI further comprises second indication information, and the second indication information indicates a timing advance (TA) of a terminal device.

18. The apparatus according to claim 17, wherein the DCI comprises a first field, wherein the first field carries the first indication information, and wherein:

when an idle state of the first field is a first preset state, the first indication information indicates the terminal device to initiate random access and retransmit the uplink data, or indicates that the uplink data fails to be demodulated; or when an idle state of the first field is a second preset state, the first indication information indicates the terminal device to initiate the random access and retransmit the uplink data, or indicates that the uplink data fails to be demodulated, and indicates to deactivate the preconfigured resource; or when an idle state of the first field is a third preset state, the first indication information indicates the terminal device to initiate the random access and retransmit the uplink data, or indicates that the uplink data fails to be demodulated, and indicates to release the preconfigured resource; or when an idle state of the first field is a fourth preset state, the first indication information indicates the terminal device to initiate early data transmission (EDT) and retransmit the uplink data, or indicates that the uplink data fails to be demodulated; or when an idle state of the first field is a fifth preset state, the first indication information indicates the terminal device to initiate the EDT and retransmit the uplink data, or indicates that the uplink data fails to be demodulated, and indicates to deactivate the preconfigured resource; or when an idle state of the first field is a sixth preset state, the first indication information indicates the terminal device to initiate the EDT and retransmit the uplink data, or indicates that the uplink data fails to be demodulated, and indicates to release the preconfigured resource.

19. The apparatus according to claim 18, wherein the DCI comprises a second field and preamble indication information, the second field carries the first indication information, and the preamble indication information indicates a preamble, and wherein:

when an idle state of the second field is a first preset state, the first indication information indicates the terminal device to initiate random access or EDT based on the preamble and retransmit the uplink data, or indicates that the uplink data fails to be demodulated; or when an idle state of the second field is a second preset state, the first indication information indicates the terminal device to initiate the random access or the EDT based on the preamble and retransmit the uplink data, or indicates that the uplink data fails to be demodulated, and indicates to deactivate the preconfigured resource; or when an idle state of the second field is a third preset state, the first indication information indicates the terminal device to initiate the random access or the EDT based on the preamble and retransmit the uplink data, or indicates that the uplink data fails to be demodulated, and indicates to release the preconfigured resource.

* * * * *

UNITED STATES PATENT AND TRADEMARK OFFICE
CERTIFICATE OF CORRECTION

PATENT NO. : 12,200,740 B2
APPLICATION NO. : 17/214187
DATED : January 14, 2025
INVENTOR(S) : Xiang Mi et al.

It is certified that error appears in the above-identified patent and that said Letters Patent is hereby corrected as shown below:

In the Claims

In Column 26, In Line 1, In Claim 5, delete "Nis" and insert -- N is --.

In Column 27, In Line 60, In Claim 12, delete "Nis" and insert -- N is --.

Signed and Sealed this
Twenty-second Day of April, 2025

Coke Morgan Stewart
*Acting Director of the United States Patent and Trademark Office*